United States Patent
Saitoh

(10) Patent No.: US 6,949,278 B2
(45) Date of Patent: Sep. 27, 2005

(54) WATER-REPELLENT SHEET WITH PROTECTIVE FILM, SHEET FOR PREVENTING SNOW ADHESION AND METHOD FOR PRODUCING WATER-REPELLENT BOARD

(75) Inventor: Tsuneyoshi Saitoh, Higashine (JP)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 10/658,656

(22) Filed: Sep. 9, 2003

(65) Prior Publication Data

US 2004/0101690 A1 May 27, 2004

(30) Foreign Application Priority Data

Sep. 13, 2002 (JP) ........................................ 2002-268718

(51) Int. Cl.$^7$ ........................ B32B 25/20; B32B 27/06; B32B 27/18; B32B 27/30; B32B 33/00
(52) U.S. Cl. ...................... 428/41.7; 428/421; 428/422; 428/447; 428/480; 428/500; 428/914
(58) Field of Search ................................. 156/234, 247; 428/41.7, 447, 480, 500, 31, 421, 422, 914

(56) References Cited

U.S. PATENT DOCUMENTS

| 3,859,120 | A | * | 1/1975 | Schramm .................... 428/336 |
| 5,203,941 | A | * | 4/1993 | Spain et al. ................. 156/209 |
| 2002/0111402 | A1 | | 8/2002 | Mizuno et al. | |

FOREIGN PATENT DOCUMENTS

| EP | 0754738 | 1/1997 |
| JP | 2-145673 | 6/1990 |
| JP | 5-92350 | 4/1993 |
| JP | 61-23656 | 5/1994 |
| JP | 10-88061 | 4/1998 |
| JP | 10-138416 | 5/1998 |
| WO | WO 99/05345 | 2/1999 |
| WO | WO 99/19414 | 4/1999 |

OTHER PUBLICATIONS

JPO English abstract of JP 10–88061 A, Apr. 7, 1998.*

* cited by examiner

Primary Examiner—Ramsey Zacharia
(74) Attorney, Agent, or Firm—James D. Christoff

(57) ABSTRACT

A water-repellent sheet has a water-repellent layer that is effectively protected from friction damage by a protective film which does not deadhere during compression bonding of the water-repellent sheet to an application surface. The protective film is easily removable after completion of compression bonding application of the water-repellent sheet to an application surface. The water-repellent sheet with a protective film contains a base layer 3 and a water-repellent layer 4 fixedly disposed on one surface of the base layer 3. A protective film 5 is bonded to the other major surface of the water-repellent layer 4. The water-repellent layer 4 contains a fluorocarbon-based polymer binder and a fluorocarbon-based resin powder dispersed in the fluorocarbon-based polymer binder and the protective film 5 is removable in such a way that a water-repellent layer 4 remains on the base layer 3 after removal of the protective film.

8 Claims, 2 Drawing Sheets

WATER-REPELLENT SHEET WITH PROTECTIVE FILM, SHEET FOR PREVENTING SNOW ADHESION AND METHOD FOR PRODUCING WATER-REPELLENT BOARD

RELATED APPLICATION DATA

This application claims priority to Japanese application no. 2002-268718, filed on Sep. 13, 2002.

BACKGROUND OF THE INVENTION

1. Field of the Invention

The present invention relates to a water-repellent sheet having a water-repellent surface protected by a protective film easily removable when used. The water-repellent sheet of the present invention can be suitably used as a sheet for preventing snow adhesion outdoors or for preventing water adhesion, utilizing water repellency.

2. Description of the Related Art

To prevent damage from snow or water to an outdoor surface such as a billboard, sign, car body or building exterior, it has been proposed to form a water-repellent layer on such a board to protect it. A water-repellent layer of this kind often contains a fluorocarbon-based polymer.

For example, Japanese Patent Laid-Open Publication No. 61-23656 discloses a composition that contains a perfluoro-compound having an extremely small intermolecular cohesive force and having good chemical stability and low surface tension. The composition contains a specific amount of a polymer of (metha)acrylate monomer having a perfluoro-alkyl group with a specific number of carbon atoms, and reduces water adhesion and snow adhesion. In addition, Japanese Patent Laid-Open No. 10-88061 discloses a composition for preventing water adhesion and snow adhesion containing a fluorocarbon-based polymer binder and a fluorocarbon-based resin powder dispersed in the binder. Application of these compositions on the surfaces of structures can form water-repellent layers on the surfaces.

When water-repellent compositions as discussed above are used, the liquid composition is often applied directly to a board at a construction site and the liquid composition is dried to form a water-repellent layer. The application of the liquid composition requires a relatively long period of time and substantial labor, and thus is inconvenient. In addition, the properties of the surface coating (water-repellent layer) after drying can depend on the weather at the construction site during application, and so water-repellent layers with consistent properties are difficult to form.

There is proposed a water-repellent sheet for a board comprising a base layer having first and second major surfaces, a water-repellent layer having a water- and snow-repellent composition applied to the first surface of the base layer, and an adhesive layer applied to the water-repellent second major surface. When such a water-repellent sheet is prepared in advance and is bonded to a board at a construction site, a water-repellent board having a water-repellent layer on the outermost surface thereof can be readily produced. Such a water-repellent sheet does not require the application of a liquid composition at the construction site, makes construction of a water-repellent board extremely simple and makes formation of a water-repellent layer independent of weather conditions at the construction site, thereby allowing for construction of water-repellent boards having consistent properties.

National Publication of International Patent Application No. 2001-511477 (corresponding to International Publication WO099/05345) discloses an example of such a water-repellent sheet in which a fluorocarbon-based polymer or a fluorocarbon-based polymer composition is applied on a surface in the form of an organic solution or a water-based organic dispersion. This sheet, obtained by selecting fluorocarbon-based polymers having a particular type of chemical structure, characteristically exhibits good thermal stability even when melt processed at 300° C. or higher (this temperature being a common process condition).

In addition, Japanese Patent Laid-Open No. 2-145673 discloses a water-repellent sheet produced by forming an adhesive layer, a base layer and a water-repellent layer in this order on a release sheet (i.e., liner). This sheet is applied to a specific location on a board whereby the release sheet is removed during use.

Furthermore, Japanese Patent Laid-Open No. 5-92350 discloses a fluorocarbon resin laminate made by modifying the surface of a sheet or film of fluorocarbon resin by electric discharge treatment of the surface to improve the adhesion of an adhesive layer to the surface where the adhesive layer is then used to adhere the laminate to a board. The electric discharge treatment is performed in an inert gas atmosphere containing an organic compound having a functional group. The adhesive is a polymer obtained by polymerizing or copolymerizing a monomer having the same functional group as that of the organic compound or having a functional group with affinity for that of the organic compound.

Still further, National Publication of International Patent Application No. 2001-520127 (corresponding to International Publication WO99/19414) discloses a protective film having an outer surface layer of a fluorocarbon polymer. This protective film is produced by forming a layer of fluorocarbon polymer on a first release liner and hardening the layer somewhat; applying an adhesive layer to a second release liner and sufficiently hardening the release layer; and subsequently applying an inter-penetrating polymer layer between the adhesive layer and the fluorocarbon polymer surface layer to heat cure it. The second release liner can be released prior to applying the adhesive layer to a board; the first release liner is released from the surface of the fluorocarbon polymer later, but before its use as a protective film. The face of the release liner which is in close contact with the fluorocarbon polymer surface layer is normally treated with a release agent. Accordingly, the release liner is not strongly bonded to the surface of the fluorocarbon polymer layer and thus can be easily removed from the fluorocarbon polymer surface layer.

However, water-repellent sheets can exhibit reduced water-repellency when the surface of the water-repellent layer has been damaged by friction with another material before it is applied to a board at a construction site. For example, bonding a water-repellent sheet to a board can be done by rubbing the surface of the water-repellent layer of the water-repellent sheet with a compression bonding jig such as a squeegee while using pressure to prevent appearance defects due to bubbles being entrapped between the water-repellent sheet and the board. However, during this type of application, the surface of the water-repellent layer can be damaged and this can reduce the water repellency due to exposure of the base layer surface, etc.

Furthermore, surface protective films are used for the protection of coatings such as the surface coatings of auto bodies. Surface protective films that can be used include self-adhesive films and adhesive films made by applying an adhesive layer to a polymer film such as polyester (PET).

Surface protective films must be removable from the surface to be protected. In addition, as discussed above, when a water-repellent sheet is bonded to a board, it is compression-bonded by pressing a compression-bonding jig to the water-repellent sheet surface. When the surface of a water-repellent layer is protected with a protective film, the protective film may deadhere from the water-repellent layer during the compression bonding operation if the adhesion between the protective film and the water-repellent layer is insufficient. Deadherence of the protective film during such a compression-bonding operation interferes with the compression bonding operation. Therefore, the protective film should not easily deadhere from the surface of the water-repellent layer. However, none of the patents described above discloses specific means for effectively protecting a water-repellent layer using a protective film.

SUMMARY OF THE INVENTION

The present invention provides a water-repellent sheet, the water repellent layer of which is effectively protected from friction damage by means of a protective film which does not deadhere during a compression bonding operation, but which is easily removable when used after the completion of compression bonding.

According to the present invention, there is provided a water-repellent sheet with a protective film, which comprises a base layer, a water-repellent layer disposed on the base layer, and a protective film bonded to the water-repellent layer. The water repellent layer is between the protective film and the base layer. The water-repellent layer contains a fluorocarbon-based polymer binder and a fluorocarbon-based resin powder dispersed in the fluorocarbon-based polymer binder, and the water-repellent layer remains on the base layer when the protective film is removed.

Also, according to the present invention, there is provided a sheet for preventing snow adhesion comprising a water-repellent sheet formed by removing the aforementioned protective film from the aforementioned water-repellent sheet with a protective film.

Furthermore, according to the present invention there is provided a method of producing a water-repellent board construction having a water-repellent layer on an outermost surface thereof, said method comprising the steps of:
(a) providing a board having a board surface;
(b) providing a water-repellent sheet having a protective film bonded thereto, wherein the water-repellent sheet having a protective film bonded thereto comprises,
  (i) a base layer having a first major surface and a second major surface,
  (ii) a water-repellent layer provided on the second major surface of the base layer, the water-repellent layer having an outer surface not in contact with the base layer, and
  (iii) a protective film provided on the outer surface of the water-repellent layer;
(c) compression bonding the water-repellent sheet having a protective film to the board via an adhesive layer disposed between the first major surface of the base layer and the board surface, the compression bonding being carried out with a compression bonding jig pressed on the surface of the protective film; and
(d) exposing the outer surface of the water-repellent layer by removing the protective film

DETAILED DESCRIPTION OF PREFERRED EMBODIMENTS

The water-repellent sheet having a protective film of the present invention has a water-repellent sheet comprising a base layer. The base layer has first major surface and a second major surface. A water-repellent layer is fixedly disposed on the second major surface of the base layer. A protective film is bonded to the outer surface of the water-repellent layer, the outer surface being that major surface of the water-repellent layer not in close contact with the base layer. Typically the water-repellent layer contains a fluorocarbon-based polymer binder and a fluorocarbon-based resin powder dispersed in the fluorocarbon-based polymer binder and the protective film is removable from the outer surface of the water-repellent layer such that the water-repellent layer remains on the base layer.

Also, this configuration of the present invention provides sufficiently close contact between the outer surface of the water-repellent layer and the protective film and as a result, the protective film does not fall off the water-repellent layer during its storage, delivery and construction, thereby permitting effective prevention of scratches and stains on the surface of the water-repellent layer until the water-repellent sheet is actually bonded to a board.

Figure 1:
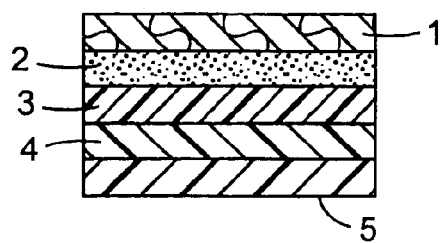
FIG. 1 is an enlarged sectional view in schematic form illustrating an example of one embodiment of a water-repellent sheet with a protective film according to the present invention.

Referring to FIG. 1, a water-repellent sheet with a protective film of the present invention will be described in detail hereinafter. FIG. 1 is an enlarged sectional view illustrating an example of a water-repellent sheet with a protective film of the present invention. The water-repellent sheet with a protective film of an embodiment shown in FIG. 1 is formed by laminating a water-repellent layer 4 and a base layer 3 on a protective film 5 and further laminating an adhesive layer 2 and a release sheet 1 in this order. The water-repellent layer 4 is formed on one face of the protective film 5 and has function of preventing adherence of snow and water to the water-repellent sheet. One of at least two methods of forming a protective film 5 on a water-repellent layer 4 with enhanced adhesion between the protective film and the water-repellent layer can be adopted. A water-repellent resin can be applied to the protective film 5 to form the water repellent layer 4 on the protective film 5, or a resin forming the protective film 5 can be applied to the outer surface of the water-repellent layer 4, where the water-repellent layer is already formed on the base layer 3. Preferably, the water-repellent resin forming the water-repellent layer 4 and the resin forming the protective film 5 are selected such that adhesion force between the water-repellent layer 4 and the protective film 5 is larger than the cohesive force within the water-repellent layer 4. Selection of such resins leads to internal fracture by cohesive failure of the water-repellent layer when the protective film 5 is removed from the water-repellent layer, and thus part of the water-repellent layer 4 is removed together with the protective film 5 without exposure of the surface of the base layer 3 (the surface of the base layer to which the water-repellent layer 4 is attached). As a result, the protective film 5 can be removed relatively easily while maintaining good adhesion between the water-repellent layer 4 and the protective film 5.

Useful types of water-repellent resins include resins containing a fluorocarbon-based polymer binder, the binder containing a fluorocarbon-based resin powder. For fluorocarbon-based polymer binders, solvent-soluble fluorocarbon-based polymers can be used and polymers of vinylidene fluoride and polymers of ethylene tetrafluoride are normally suitable. Fluorocarbon-based polymer binders may be blended with other polymers, including acrylic-silicone polymers, polyesters, ethylene/carbon monoxide copolymers, ethylene/vinyl ketone copolymers, propylene/vinyl ketone copolymers, styrene/vinyl ketone copolymers and silicones. In the case where blends are used, the percentage of fluorocarbon-based polymers with respect to the total amount of binders is normally at least about 60% by weight, preferably at least about 75% by weight, and more preferably at least about 90% by weight.

In addition, as the aforementioned fluorocarbon-based resin powders, ethylene tetrafluoride resin powder, ethylene tetrafluoride/propylene hexafluoride copolymer resin powder and vinylidene fluoride resin powder can be used alone or a mixture of a plurality of these resin powder. The amount of fluorocarbon-based resin powders added is about 5% to about 90% by weight, preferably about 30% to about 90% by weight, and more preferably about 50% to about 90% by weight, when the sum of the weight of fluorocarbon-based polymer binders and fluorocarbon-based resin powders is taken as 100% by weight. In order for the cohesive failure to occur easily, in other words in order to be able to easily remove the protective film 5 with a low force, it is advantageous to increase the amount of fluorocarbon-based resin powders to be added. On the other hand, in order to increase the cohesive strength of the water-repellent layer itself, it is advantageous to decrease the amount of fluorocarbon-based resin powder to be added.

Coating formulations used to form the water-repellent layer may include solvents and additives in addition to the aforementioned components. It is effective to adjust the viscosity of the water-repellent layer coating formulation in order to obtain a uniform coating when the water-repellent liquid coating formulation is applied. For this purpose, a solvent is sometimes added. These solvents include ester-based solvents such as butyl acetate and ethyl acetate, alcoholic solvents such as ethyl alcohol and isopropyl alcohol, other aromatic and aliphatic solvents, and the like.

Optional additives can include fluorocarbon oils such as perfluoropolyether oils, perfluoroalkylpolyether and ethylene trifluoride polymers, fluorocarbon-based surfactants, titanium oxide powder, colored pigments, and materials which function as thermal stabilizers, anti-foaming agents and ultraviolet absorbers.

Protective films are used for protecting the surface of the water-repellent layer. Examples of materials for protective films include poly(ethylene terephthalate) polymers, polypropyrene polymers, polyethylene polymers, urethane polymers, vinyl chloride polymers, acrylic polymers, and vinyl chloride/vinyl acetate copolymers. The thickness of the protective film is about 5 to about 100 $\mu$m, preferably about 10 to about 50 $\mu$m. In addition, in order to enhance the adhesion between the protective film and the water-repellent layer, the face of the protective film in contact with the water-repellent layer is preferably not treated with a release agent such as a silicone release agent.

The base layer reinforces and supports the water-repellent layer and preferably has excellent heat resistance, resistance to cold, contraction resistance, flexibility, weather resistance and chemical resistance. Examples of materials useful for the base layer include polyurethanes, polyimides, nylons, polyethylene, polyesters, polycarbonates, vinyl chloride resins, metals, acrylic resins, and olefin resins. The thickness of the base layer is about 5 to about 100 $\mu$m, preferably about 10 to about 50 $\mu$m.

An adhesive layer can be used to bond the water-repellent sheet to a board, and is a layer that contains an adhesive. Resins that can be used for an adhesive layer include acrylic resins, urethane resins and silicone resins. The aforementioned resins to which a crosslinking agent is added can also be used in applications required for heat resistance, weather resistance, etc. The thickness of the adhesive layer is about 5 to about 100 $\mu$m, preferably about 10 to about 50 $\mu$m. Examples of release sheets for protecting the adhesive face of an adhesive layer include PET films, free sheets and glassine paper release-treated with silicone resin, melamine resin, etc.

Examples of methods for preparing the aforementioned water-repellent sheet with a protective film include the methods below, but are not particularly limited to them if they can enhance the adhesion between the water-repellent layer and the protective film layer to prevent deadherence and loss of the protective film layer before the water-repellent sheet is used.

Figure 2:
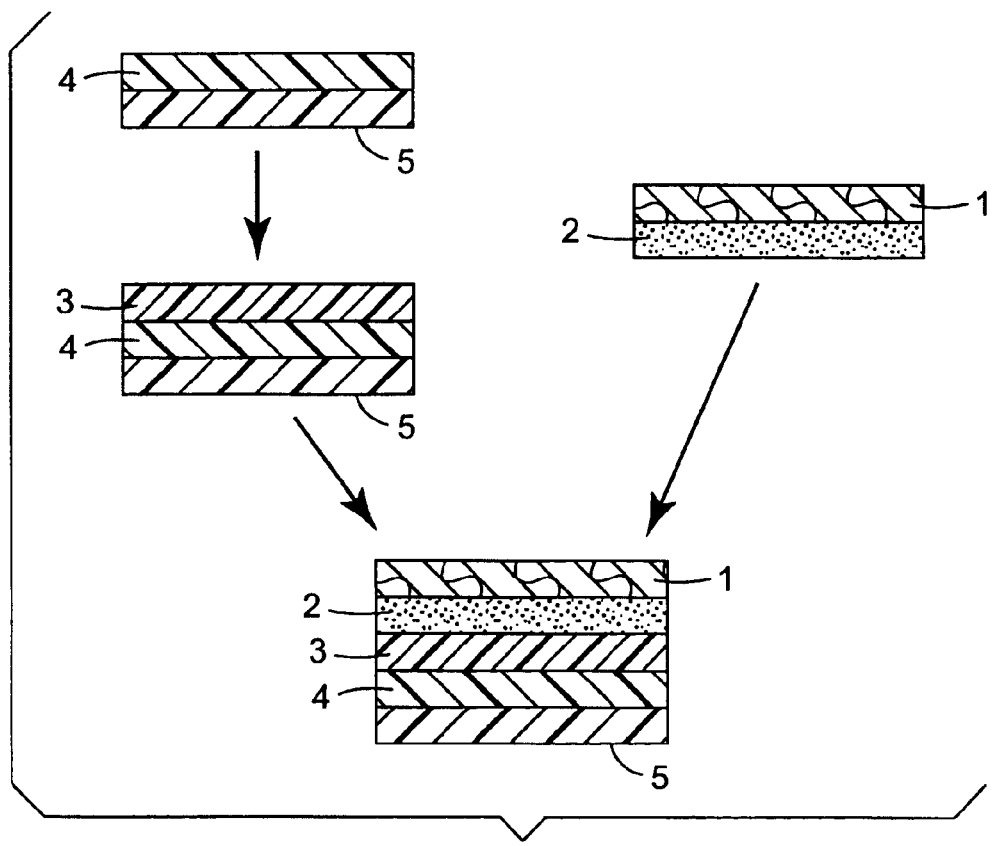
FIG. 2 is a schematic diagram showing an example of a method for preparing a water-repellent sheet with a protective film according to the present invention.

An example of a process for preparing the aforementioned water-repellent sheet with a protective film will be discussed with reference to FIG. 2. First, a protective film 5 is kept on hand, and to one face of this film is applied a water-repellent liquid coating formulation to form the water-repellent layer 4 and then a resin to be a base layer 3 is further applied to a surface of the water-repellent layer 4, that surface being the surface of the water-repellent layer on the opposite side of the water-repellent layer from the protective film 5. A water-repellent sheet having a protective film is thus formed. Separately, to the surface of a release sheet 1 is applied an adhesive resin to prepare a sheet with an adhesive layer 2. The surface of the adhesive layer 2 of the sheet with an adhesive layer, that surface not adjacent to the release sheet 1, is adhered to the free surface of the base layer 3 of the aforementioned water-repellent sheet, the free surface of the base layer being that major surface of the base layer on the opposite side of the base layer from the water-repellent layer 4. A water-repellent sheet having a protective film and an adhesive layer is thus formed.

Figure 3:
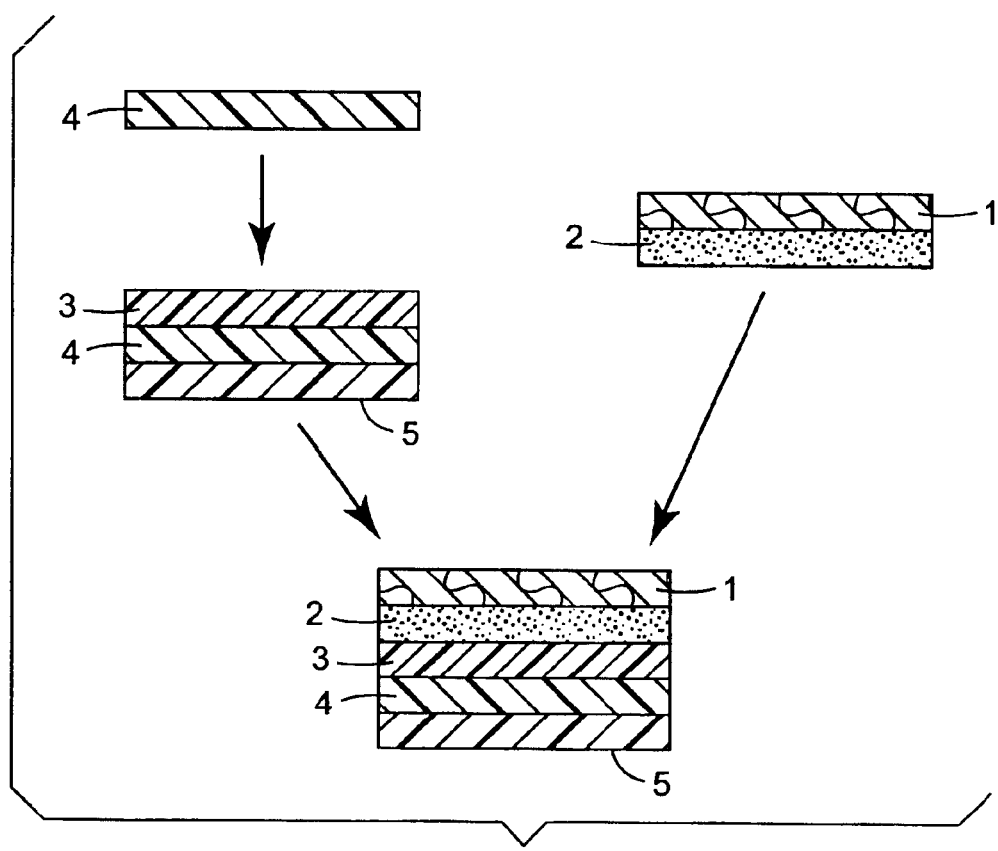
FIG. 3 is a schematic diagram showing another example of the method for preparing a water-repellent sheet with a protective film according to the present invention.

Another example of a process for preparing the aforementioned water-repellent sheet with a protective film will be discussed with reference to FIG. 3. First, to one major surface of a base layer 3 is applied a water-repellent layer coating formulation to form the water-repellent layer 4. Then, to the free surface of the water-repellent layer 4, the free surface being that major surface of the water-repellent layer on the opposite side of the water-repellent layer from the base layer 3, is further applied a resin to be a protective film 5. In addition, separately, to a release sheet 1 is applied an adhesive resin to form a sheet with an adhesive layer 2. The free surface of the adhesive layer 2 of this sheet, the free surface being that major surface on the opposite side of the adhesive layer from the release sheet 1, is bonded to the free surface of the base layer 3 having the aforementioned protective film 5 and the water-repellent layer 4 laminated thereon, the free surface of the base layer being that surface on the opposite side of the base layer from the water-repellent layer 4. A water-repellent sheet having a protective film and an adhesive layer is thus formed to produce a water-repellent sheet.

The water-repellent sheet with a protective film of the present invention is suitably utilized as a sheet for preventing snow adhesion or ice adhesion outdoors, utilizing its water repellency, and more specifically is suitably used by adhering it to an outdoor electric light pole, an antenna or accessories thereof, a roof, an overhead bridge, a window, a wall, a tunnel or other types of structure. A sheet for preventing snow adhesion comprising a water-repellent sheet prepared by removing the protective film from the water-repellent sheet with a protective film of the present invention is effectively protected by the protective film from dirt or damage due to friction caused by other solids until the protective film is removed, or until it is actually used as a sheet for preventing snow adhesion, thus not effecting a loss of water repellency due to damage or dirt and displaying expected water repellency.

A method of producing a water-repellent board having a water-repellent layer on the outermost surface thereof by adhering the water-repellent sheet with a protective film of the present invention to a variety of application surfaces such as an outdoor sign or signboard, a car body or the outer surface of a building involves: bonding a water-repellent sheet with a protective film to an application surface through the medium of an adhesive layer disposed between the application surface and the free-surface of the base layer of the water-repellent sheet with a protective film (the free surface being the surface of the base layer on the opposite side of the base layer from the water-repellent layer); pressure-bonding the water-repellent sheet with a protective film to the application surface with a jig for compression bonding, wherein the jig is pressed on the surface of the protective film; and subsequently exposing the water-repellent layer to the outermost surface by removing the protective film.

In the water-repellent sheet with a protective film of the present invention, adhesion between the water-repellent layer and the protective film is relatively high and the protective film remains well-adhered to the surface of the water-repellent layer during compression bonding operation. However, the protective film can be easily removed after completion of compression bonding operation, and so use of this method permits easy production of a water-repellent application surface having a water-repellent layer on the outermost surface thereof without damaging the water-repellent layer.

Examples

Hereinafter, the present invention will be discussed further in detail based on examples, but the invention is not limited to these examples.

Example 1

A water-repellent liquid coating formulation, which had been prepared by the addition of 60% by weight of a resin powder of polytetrafluoroethylene ("HIREC 100" brand water-repellent liquid, from NTT Advanced Technology Corporation of Tokyo, Japan) to a polymer binder primarily comprising a vinylidene fluoride/tetrafluoroethylene copolymer and polymethyl methacrylate, was applied using a knife coater to a polyethylene terephthalate film with a thickness of 50 $\mu$m to be a protective film, in such a way that the thickness after drying was 30 $\mu$m. The solvent used was butyl acetate, and the coating had a solids content of 46%. This film was dried at 100° C. for two minutes to form a water-repellent layer, and to the surface of this water-repellent layer was applied using a knife coater a vinyl chloride resin paste with a solid content of 70% containing a plasticizer such that the thickness after drying was 30 $\mu$m, and then was dried at 100° C. for one minute and further at 200° C. for 1 minute to form a base layer, thereby obtaining a water-repellent sheet with a protective film.

In addition, separately, to a release sheet (product of Tohcello Co. Ltd. of Tokyo, Japan; trade name SP-PET) was applied using a knife coater an adhesive (prepared by adding bisamide-based crosslinking agent to a copolymer of 2-methylbutyl acrylate and acrylic acid in such a way that the thickness after drying was 30 $\mu$m and the resulting sheet was dried at 70° C. for one minute and further at 90° C. for one minute. To the free surface of the base layer of the aforementioned water-repellent sheet with a protective film, the free surface being that surface of the base layer on the opposite side of the base layer from the water-repellent layer, was bonded the release sheet coated with the adhesive to give a water-repellent sheet with a protective film having an adhesive layer.

The release sheet was removed from the water-repellent sheet having a protective film, revealing the adhesive layer surface. The adhesive layer surface was gently placed on an aluminum board (product of Sumitomo Lightmetal Co. Ltd.; trade name 1100-0) and then the water-repellent sheet was compression-bonded so as not to entrap air by reciprocating a squeegee (product of 3M Company; trade name Plastic Squeegee PA-1) three times on the surface of the protective film. Thereafter, the protective film was removed from the construction, and the water-repellent layer surface that appeared on removal of the protective film was measured for water contact angle after compression bonding by means of a contact angle meter (product of Kyowa Interface Co. Ltd.; type CA-Z). The measurement is given in Table 1.

Example 2

A vinyl chloride resin paste with a solid content of 70% containing a plasticizer was applied using a knife coater to a release-treated polyethylene terephthalate film with a thickness of 50 $\mu$m (product of Teijin Co. Ltd.; trade name KT) in such a way that the thickness after drying was 30 $\mu$m and then was dried at 100° C. for one minute and further at 200° C. for one minute to form a base layer. The surface of this base layer was coated using a knife coater with the water-repellent liquid coating formulation used in Example 1 in such a way that the thickness after drying was 30 $\mu$m and then was dried at 100° C. for two minutes to form a water-repellent layer. Then, to the surface of this water-repellent layer was applied (using a knife coater) a resin solution primarily comprising a vinyl chloride/vinyl acetate copolymer resin with a solid content of 50% to become a protective film for the water-repellent layer in such a way that the thickness of the protective film after drying was 20 $\mu$m. The protective film coating solution was dried at 80° C. for one minute and further at 150° C. for one minute to obtain a water-repellent sheet with a protective film.

In addition, separately, to a release sheet (product of Tohcello Co. Ltd.; trade name SP-PET) was applied using a knife coater an adhesive (prepared by adding bisamide-based crosslinking agent to a copolymer of 2-methylbutyl acrylate and acrylic acid) in such a way that the thickness after drying was 30 $\mu$m and the resulting sheet was dried at 70° C. for one minute and further at 90° C. for one minute. The release-treated polyester sheet was removed from the aforementioned water-repellent sheet, baring a free surface of the base layer. To this base layer free surface, the release sheet coated with adhesive was adhered, thereby obtaining a water-repellent sheet with a protective film having an adhesive layer.

The surface of the adhesive layer appearing after removal of the release sheet of the water-repellent sheet was gently placed on an aluminum board (product of Sumitomo Lightmetal Co. Ltd.; trade name 1100-0) and then the water-repellent sheet was compression-bonded so as not to entrap air by reciprocating a squeegee (product of 3M Company; trade name Plastic Squeegee PA-1) three times on the surface of the protective film. Thereafter, the protective film was removed, baring a fresh surface of the water-repellent layer. The fresh surface of the water-repellent layer was measured for water contact angle after compression bonding by means of a contact angle meter (product of Kyowa Interface Co. Ltd.; type CA-Z). The measurement is given in Table 1.

Comparative Example

A vinyl chloride resin paste with a solid content of 70% containing a plasticizer was applied using a knife coater to a release-treated polyethylene terephthalate film with a thickness of 50 $\mu$m (product of Teijin Co. Ltd.; trade name KT) in such a way that the thickness after drying was 50 $\mu$m and then was dried at 100° C. for one minute and further at 200° C. for one minute to form a base layer. The surface of this base layer was coated using a knife coater with the water-repellent liquid coating formulation used in Example 1 in such a way that the thickness after drying was 30 $\mu$m, the drying having been performed at 100° C. for two minutes, thereby obtaining a water-repellent sheet.

In addition, separately, to a release sheet (product of Tohcello Co. Ltd.; trade name SP-PET) was applied using a knife coater an adhesive (prepared by adding bisamide-based crosslinking agent to a copolymer of 2-methylbutyl acrylate and acrylic acid) in such a way that the thickness after drying was 30 $\mu$m and the resulting sheet was dried at 70° C. for one minute and further at 90° C. for one minute. The release-treated polyethylene terephthalate film was removed, baring a free surface of the base layer. To this free surface of the base layer of the water-repellent sheet, the release sheet coated with this adhesive was adhered, thereby obtaining a water-repellent sheet having an adhesive layer.

The water-repellent layer on the outermost surface of this water-repellent sheet was measured for the contact angle prior to compression bonding as with Examples 1 and 2 previously discussed. In addition, the surface of the adhesive layer appearing after releasing the release sheet of this water-repellent sheet was gently placed on an aluminum board (product of Sumitomo Lightmetal Co. Ltd.; trade name 1100-0) and then the water-repellent sheet was compression-bonded so as not to entrap air by reciprocating a squeegee (product of 3M Company; trade name Plastic Squeegee PA-1) three times on the surface of the protective film. Thereafter, the water-repellent layer on the outermost surface was measured for contact angle subsequent to compression bonding as with Examples 1 and 2 as previously discussed. The measurement is shown in Table 1.

TABLE 1

|  | Example 1 | Example 2 | Comparative Example |
|---|---|---|---|
| Water contact angle (prior to compression bonding) | — | — | 141° |
| Water contact angle (subsequent to compression bonding) | 140° | 139° | 113° |

As per the results shown in Table 1, the water-repellent sheets having a protective film of Examples 1 and 2 show large water contact angles subsequent to compression bonding as compared with the sheet with no protective film in the Comparative Example and exhibited high water repellency inasmuch as the protective film properly protects the surface of the water-repellent layer at the time of compression bonding operation onto the board. In addition, although the water-repellent sheet of the Comparative Example showed a water contact angle similar to those in Examples 1 and 2 prior to compression bonding, it showed a large decrease thereof after compression bonding in that the water-repellent layer partly deadhered due to the friction with the squeegee and the surface of the base layer was partly exposed during compression bonding operation.

As discussed so far, the water-repellent sheet with a protective film of the present invention shows excellent adhesion between the surface of a water-repellent layer and the protective film, and thus the protective film protects the surface of the water-repellent layer without deadhering from the water-repellent layer during its storage, delivery and during the compression bonding operation, thereby permitting effective prevention of scratches and stains on the surface of the water-repellent layer until the water-repellent sheet is bonded to an application surface such as a board and the protective film is thereafter removed.

What is claimed is:

1. A water-repellent sheet with a protective film, which comprises:

a base layer;

a water-repellent layer disposed on the base layer; and a protective film bonded to the water-repellent layer such that the water-repellent layer is between the protective film and the base layer, wherein the water-repellent layer contains a fluorocarbon-based polymer binder and a fluorocarbon-based resin powder dispersed in said fluorocarbon-based polymer binder, wherein the water-repellent layer exhibits a certain cohesive force, and wherein the adhesive force between the water-repellent layer and the protective film is greater than the cohesive force.

2. The water repellent sheet of claim 1 wherein the water repellent layer comprises water-repellant material, the protective film capable of being removed from the water-repellent layer such that the water-repellent layer remains disposed on the base layer and is capable of preventing snow adhesion while some of the water-repellent material remains on the protective film.

3. The water-repellent sheet of claim 1 wherein the fluorocarbon-based polymer binder comprises: a fluorocarbon-based polymer and an additional polymer, the additional polymer comprising an acrylic-silicone polymer, a polyester, an ethylene/carbon monoxide copolymer, an ethylene/vinyl ketone copolymer, an propylene/vinyl ketone copolymer, a styrene/vinyl ketone copolymer, or a silicone.

4. The water-repellent sheet of claim 3 wherein the fluorocarbon-based polymer comprises a polymer of vinylidene fluoride or a polymer of ethylene tetrafluoride.

5. The water-repellent sheet of claim 1 wherein the concentration of the fluorocarbon-based resin powder ranges from about 30 weight percent to about 90 weight percent, based on the total weight of the fluorocarbon-based polymer binder and the fluorocarbon-based resin powder in the water-repellent layer.

6. The water-repellent sheet of claim 1 wherein the concentration of the fluorocarbon-based resin powder ranges from about 50 weight percent to about 90 weight percent, based on the total weight of the fluorocarbon-based polymer binder and the fluorocarbon-based resin powder in the water-repellent layer.

7. The water-repellent sheet of claim 1 wherein the water-repellent sheet further comprises a release sheet adhesively bonded to the base layer, the water-repellent layer and the release sheet located on opposing sides of the base layer.

8. The water repellent sheet of claim 1 wherein the water-repellent layer is capable of exhibiting a water contact angle of 140° after the water-repellent sheet undergoes compression bonding to a surface and removal of the protective film from the water-repellent layer.

* * * * *